United States Patent [19]

Blöhbaum

[11] Patent Number: 5,569,900
[45] Date of Patent: Oct. 29, 1996

[54] METHOD AND OPTICAL SCANNING APPARATUS FOR THE IDENTIFICATION OF A CODE CONSISTING OF SEQUENTIAL LIGHT AND DARK FIELDS

[75] Inventor: Frank Blöhbaum, Bad Krozingen, Germany

[73] Assignee: Erwin Sick GmbH, Optik-Elektronik, Waldkirch, Germany

[21] Appl. No.: 273,561

[22] Filed: Jul. 11, 1994

[30] Foreign Application Priority Data

Jul. 12, 1993 [DE] Germany .......................... 43 23 293.0

[51] Int. Cl.$^6$ .......................................... G06K 7/10
[52] U.S. Cl. .......................................... 235/463; 235/462
[58] Field of Search .................................... 235/462, 463

[56] References Cited

U.S. PATENT DOCUMENTS

| | | |
|---|---|---|
| 3,882,464 | 5/1975 | Zamkow . |
| 4,000,397 | 12/1976 | Hebert . |
| 4,354,101 | 10/1982 | Hester . |
| 4,438,327 | 3/1984 | Smith . |
| 4,528,443 | 7/1985 | Smith . |
| 4,992,650 | 2/1991 | Somerville . |
| 5,487,115 | 1/1996 | Surka ...................................... 235/462 |

FOREIGN PATENT DOCUMENTS

| | | |
|---|---|---|
| 23 40 688 | 2/1975 | Germany . |
| 58-92066 | 6/1983 | Japan . |

OTHER PUBLICATIONS

JP 57-6976 A. In: Patent Abstracts of Japan, P-112, Apr. 27, 1982, vol. 6, No. 66.

*Primary Examiner*—Harold Pitts
*Attorney, Agent, or Firm*—Townsend and Townsend and Crew; J. Georg Seka; John T. Raffle

[57] ABSTRACT

The invention relates to an optical scanning apparatus for the identification of a code (11) consisting of sequential light and dark fields which respectively form modules (16, 17, 18, 19, 20, 21, 22) put together from an upwardly restricted integral multiple number of base running lengths (B1), to a module width (M), with a predetermined number of sequential modules (16, 17, 18, 19, 20) and base running lengths (B1) in the code forming a mark (25). The optical scanning apparatus guides a light bead (13), the extent of which is less than the base running length (B1) and at most only fractionally larger than the base running length (B1) of the code (11), over the modules (16, 17, 18, 19, 20, 21, 22) in sequence. By means of its light receiver (15), the light scattered back from the regions of the code (11) met by the light bead (13) is received, and a corresponding electrical signal is transmitted at the output (24). A sequence of individual pulses is formed by differentiation and rectification. A differential stage (26) with rectification and a counting stage (27) for the clock pulses generated by a clock generator (28) between two predetermined heights of the flanks of sequential individual pulses is connected to the light receiver (15). The individual counting results are applied to a memory (29) and stored there.

41 Claims, 5 Drawing Sheets

| E1=0,25 | E1=0 | E1=0,25 | E1=1 | E1=1 | E1=0,25 |
| E2=0,8 | E2=0 | E2=0,8 | E2=0 | E2=0 | E2=0,8 |
| E3=0 | E3=0 | E3=0 | E3=0 | E3=0 | E3=0 |
| E4=0 | E4=1 | E4=0 | E4=0 | E4=0 | E4=0 |
| K1=0,8 | K1=0 | K1=0,8 | K1=0 | K1=0,25 | K1=0,8 |
| K2=0 | K2=0 | K2=0 | K2=0 | K2=0 | K2=0 |
| K3=0 | K3=0 | K3=0 | K3=0 | K3=0 | K3=0 |

METHOD AND OPTICAL SCANNING APPARATUS FOR THE IDENTIFICATION OF A CODE CONSISTING OF SEQUENTIAL LIGHT AND DARK FIELDS

BACKGROUND OF THE INVENTION

The present invention is directed to an optical scanning arrangement and a method for reading a code.

Scanning arrangements with scanning devices for the reading of codes are known (DE-PS 23 40 688). In general these scanning devices operate in such a way that via an optical system and a mirror wheel or an oscillating mirror a laser beam forming a scanning beam periodically scans the surface on which the code is arranged. Depending on whether the scanning light bead falls onto a lighter or darker point of a code more or less light is scattered backwards to the scanning device which detects this quantity of light, for example in accordance with the autocollimation principle, and transmits a corresponding evaluation signal.

Decisive for the reliability of code reading is now the sharpness and size of the scanning light bead which is guided over the code. The sharpness of the scanning light bead is thereby materially co-determined by the image forming characteristics of the scanning device. The resolution of fine image structures is restricted by the scanning frequency of the reflected light and the light bead diameter.

The light bead shape and size changes in dependence on the spacing of the scanning device from the surface carrying the code (a follow-up adjustment of the sharpness and/or enlargement does not take place via an autofocussing device). The modulation of the light scattered back from the code only corresponds in a narrowly restricted range of distances in a defined and evaluatable manner to the actual sequence of code fields. Outside of this range of focus, the light bead shape and size change such that the light dark modulation of the light scattered back from the code no longer reproduces the relationships of the original code sufficiently accurately in order to generate a corresponding output signal.

Complicated image distortions arise which in particular present a problem in the following applications.

Recognition and classification of images by comparison with normal images;

strongly fluctuating changes of the spacing of the scanning device from the surface carrying the code, with the limits of the range of focus being exceeded;

rapid image change which makes it very difficult to autofocus regulation by optical means.

In accordance with the prior art the listed difficulties are typically overcome with expensive image forming optical systems or with a very rapidly operating autofocus regulation system which is however very complicated and costly for this purpose.

SUMMARY OF THE INVENTION

In order to satisfy this object the features of the characterising parts of claims 1 and 36 are provided.

The basic concept of the invention is thus to be seen in the fact that knowledge concerning the character of the code that is used and knowledge of the optical distortions of the scanning light bead for a special scanning device within a specific range of distance variation, are present or fixed. This knowledge can, for example, be empirically derived, and by taking account of this knowledge from the received signals, which can differ in part considerably from actual code structure, it is possible to draw conclusions on the correct code structure.

For this purpose it is necessary to find a method in which the information of two neighbouring module widths are so computed with one another that a displacement of the measured module widths in the direction of the actual module widths of the module being considered results. A correction process which effects this shifting operation with customary methods of information processing cannot be developed or can only be developed with great expense and complexity. The object of effecting the shifting of the measured module widths in the direction of the actual module widths is accordingly solved by the invention by an iterative method. First, one assumes the poorest possible boundary values for module width combinations in order to specify important starting parameters for the method such as the membership functions (described in more detail below) and the linking operations. Next further typical combinations of module widths can be taken into account in order to adapt the values determined from the poorest possible limiting values for the module width combinations in the direction of a more accurate shift from measured module widths to the actual module widths, or in order to change the scope of the parameters used for this purpose. For this it is sufficient to consider selected typical combinations in place of all the actual prevailing combinations of module widths, so that the development complexity is substantially reduced. The method developed from the typical combinations of module widths, such as the correction process set forth below as a computing example, represents an approximated model of the imaging characteristics of the optical scanning device and of the characteristics of the further component groups which influence the electrical signal, such as the characteristics of the light receiver in dependence on the focus position. This results, with all the prevailing combinations of the module widths, in a shift of the measured module widths relative to the actual module widths.

The method can for example be executed on a program-controlled microprocessor or also, as in the example described below, by means of a fixed wire circuit which uses memories, tables deposited in a memory and combining stages.

A precondition for the use of the invention is the fact that the correction values, i.e. the parameters determined for the method can be derived with the same scanning device in which they are later used. Thus an optical scanning device must first be used for the determination of the correction values which is the same as the one with which the correction values are later used. If one can assume that a whole set or type of optical scanning devices is optically identical then the correction values can also be derived with another optical scanning device of this type and can be used with other scanning devices of the same type. A further important precondition is the fact that the electronic evaluation groups which deliver the electrical signal to be evaluated, are all the same or at least of the same type during the derivation of the correction values. The mathematical modelling method thus contains, in addition to the optical distortions also the transmission characteristics of electronics, in particular of the differentiating and rectifying stages that are used.

A further precondition for the use of the application is the fact that a code of the same character must be used for the derivation of the correction values and during the later measurement.

The method of the invention and the scanning arrangement of the invention will be explained by way of example with reference to the recognition of a bar code which is scanned with a laser scanner and the spacing of which from the laser scanner lies outside of the range of focus. If the laser scanner forming the scanning device is arranged outside of the range of focus the modulation of the back scattered light no longer sufficiently accurately corresponds to the width relationships of the modules, in particular because the module width is distorted on scanning of the code in dependence on the module width in the neighbouring modules. This can lead to the fact that decoding or recognition of the mark can be faulty or can become impossible when the modules forming a mark are associated with this mark in accordance with a method known in the prior art. As an association method of this kind one can, for example use the threshold value method in which each measured module width is associated with the next integral multiple of the base running length which arises in the code and a corresponding mark is then associated with a group of these integral multiples of the base running length.

The distortion of the module widths leads to running length enlargements and reductions which cannot have any counter-part in the original modules. These distortions cannot be described mathematically or only with very great complexity.

Through the method of the invention and the scanning arrangement of the invention these distortions can be corrected to the extent that within a substantially enlarged range of distance variation when compared with the range of focus a troublefree recognition of a code contained in the mark is ensured.

The invention will be described in the following by way of example and with reference to the drawings in which are shown.

BRIEF DESCRIPTION OF THE DRAWINGS

DESCRIPTION OF THE PREFERRED EMBODIMENTS

In accordance with FIGS. 1A through 1E a code 11 comprises a plurality of sequential marks 25 of which only one is fully shown in FIG. 1. This may be the first mark of a code 11 in front of which a longer white field 23 is located. The mark 25 is followed by a further mark of which the first module is indicated at 22.

The mark 25 consists of six modules 16, 17, 18, 19, 20, 21 which are alternately dark and light and which each have a width which is the same as one, two, three or four times a base running length B1. The first dark module 16 has a width of two base lengths B1, the second module 17 a width M of four base lengths, the third, fourth and fifth modules 18, 19 and 20 each have a width the same as a base running length B1 and the sixth module 21 has a width equal to two base running lengths. The mark 25 consists of six modules and has a length equal to eleven base running lengths. The largest module width which is permitted corresponds to four base running lengths.

Figure 1A:
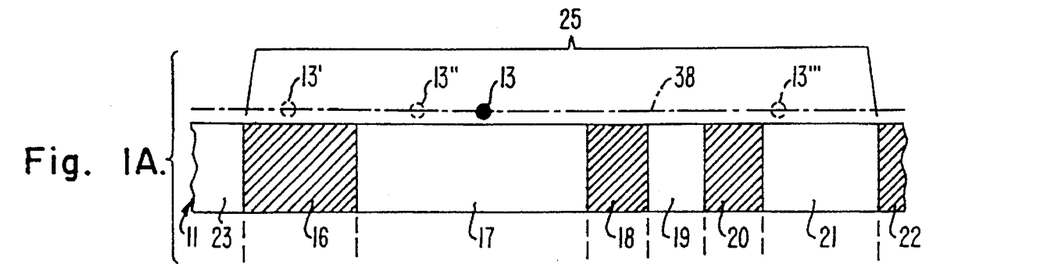
FIGS. 1A through 1E are schematic illustrations of a section of a bar code and of the associated received signal at the output of the laser scanning device.
Figure 1B:
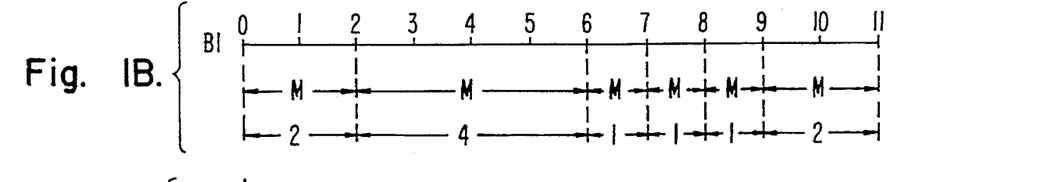

The code 11 is scanned from the left to the right in the direction of the arrow F by a scanning light bead 13 which is indicated above it for the sake of clarity. A few further positions of the scanning light bead 13 are reproduced simply by way of example on the scanning line 38 defined by it at 13', 13", 13'".

Figure 5:
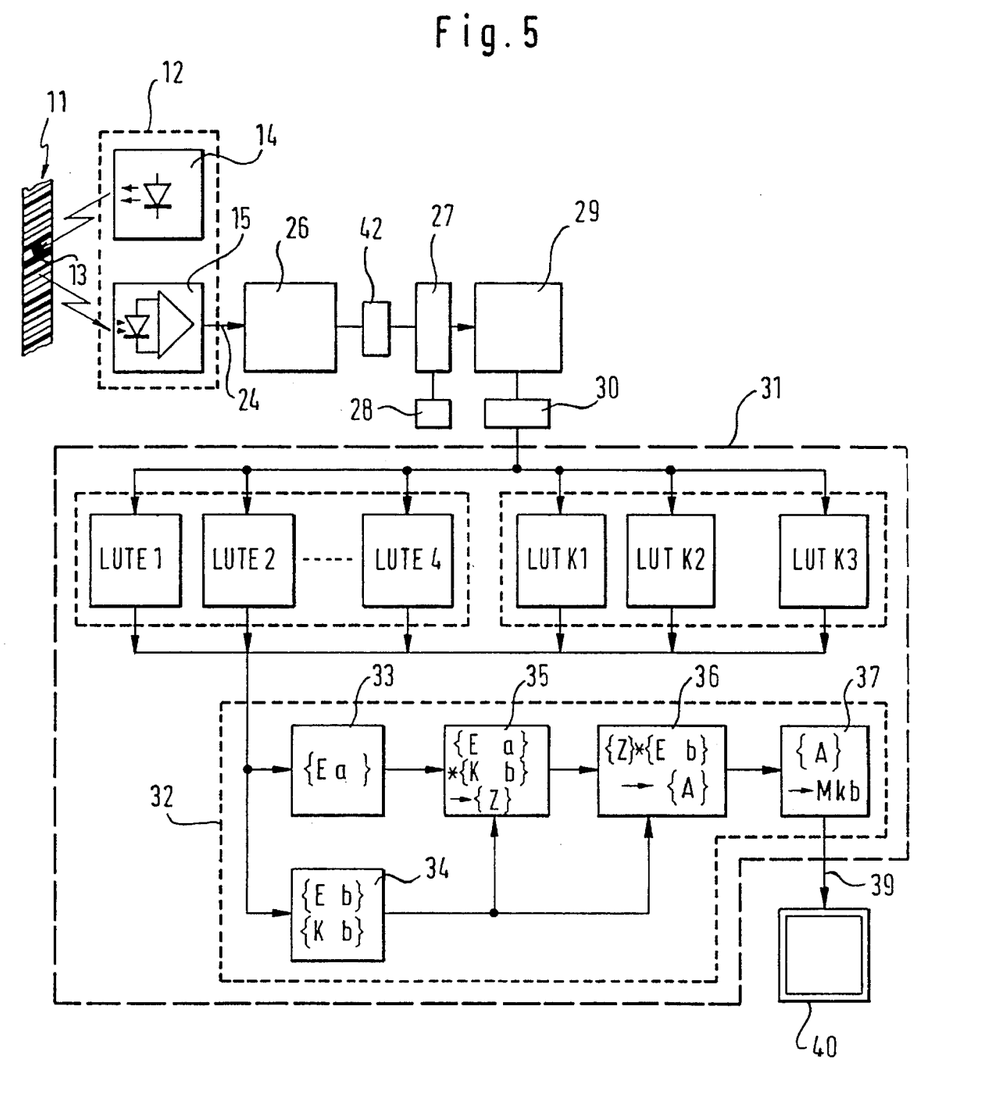
FIG. 5 is a block circuit diagram of an optical scanning device in accordance with the invention.

As seen in FIG. 5 the light bead 13 is generated on the code 11 by a light scanner 14, the basic construction of which can correspond to German patent 23 40 688 the complete disclosure of which is incorporated herein by reference. The light scattered back from the region of the code 11 struck by the scanning light bead 13 is received by a light receiver 15 at the output 24 of which an electrical signal arises which is representative of the light scattered back from the part of the code 11 struck by the light bead 13. This output signal is applied to a differentiation stage 26 which differentiates and preferably also rectifies the received signal.

Figure 1C:
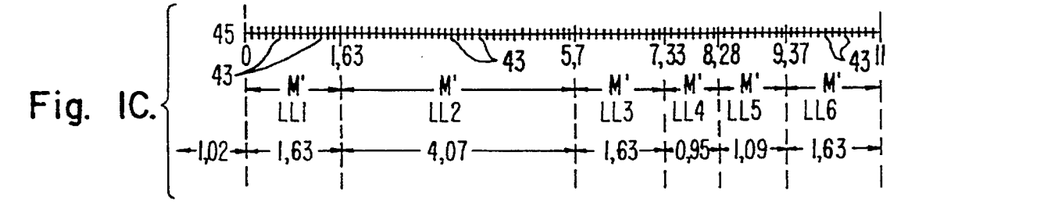
Figure 1D:
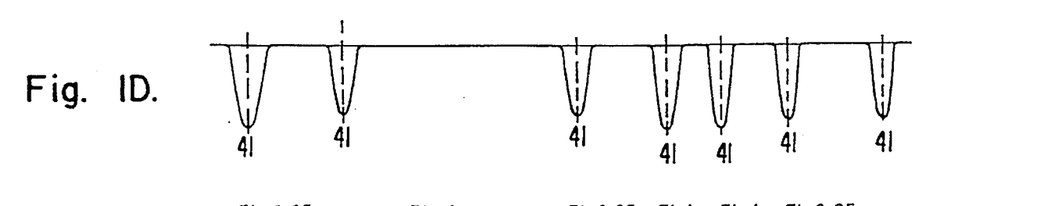

The differentiated and rectified signal is reproduced in FIG. 1D beneath the code 11 to the same time scale. As a result of the finite size of the scanning light bead 13 and the possibly present optical distortions, the differentiated signal does not consist of needle pulses, but rather of individual pulses 41 of greater or lesser width and height which are moreover displaced to the one side or the other relative to the actual boundaries of the modules 16, 17, 18, 19, 20, 21.

After the differentiation the signals which arise on the transition from the dark fields to the light fields have the opposite sign to the individual pulses which arise with the transition from light to dark. However, the negative individual pulses are folded, for example downwardly, by the rectification in the differentiation stage 26 so that, at the output of the differentiating stage 26, one obtains a pulse pattern as illustrated in FIG. 1D beneath the code 11.

It is of particular importance that the actual pulse pattern obtained at the output of the differentiating stage 26 is normalized which signifies that the total length of a mark 25 corresponds to eleven base running lengths B1. This normalized is already taken into account in the diagram of FIGS. 1A through 1E.

The differentiating stage 26 is followed by a counting stage 27 acted on by a clock generator 28 and the counting stage 27 for example counts the time between the maxima of two sequential individual pulses 41. A threshold value circuit 42 is however preferably connected between the differentiating stage 26 with rectification. The circuit 42 transmits a signal to the counting stage 27 at the time where the rising or falling flank of an individual pulse 41 exceeds or falls short of an amplitude determined by suitable setting of the threshold value. The counting stage 27 stops the running count stores the count that has been achieved in a subsequent memory 29, it also triggers a new counting procedure of the counting stage 27. Through the counting of the time as a multiple of a basic clock period of a clock 28, discrete values 43 are associated with the individually measured continuously distributed lengths. The result of the count is reproduced in FIG. 1C. Accordingly the module 16 has a measured module width M' of LL1=1.63 base running lengths, the module 17 of LL2=4.07 base running lengths, the module 18 of again LL3=1.63 base running lengths, the module 19 of LL4=0.95 base running lengths, the module 21 of LL5=1.09 base running lengths and the module 21 of LL6=1.63 base running lengths. These measured module widths are deposited in a memory 29 in accordance with FIG. 5.

The measured module widths of pairs of directly sequential modules 16, 17; 17, 18; 18, 19; 19, 20 and 20, 21 are now selected one after one another from a two module selection stage 30 connected to the memory 29 and are compared with one another in a subsequent correction stage 31. In the following the first module of a selected pair is referred to as a, the second module as b.

Correcting values which were previously empirically determined by the scanning of a known code 11 of the same character are stored for each arising pair of measured module widths in the correction stage 31. Thus it is known which output value the correction stage 31 must make available for a specific pair of measured module widths of neighbouring modules at its output 39 for the measurement result to be corrected in the correct direction.

Basically speaking, one output value could be stored in each case in the correction stage 31 for each individual pair of the measured module width of sequential modules, which corresponds to the storage of a three-dimensional function with the measured module widths of the pair of sequential modules being recorded on the X and Y axes and with the value which is read off on the Z axis being the correction value.

The correction is however preferably systematised and thereby substantially simplified in accordance with the FIGS. 1 to 4.

Thus, in the correction stage 31, a membership function E (shown in FIG. 2) is first implemented which gives, for each measured module width the fraction of the membership to the individual integral modular width values and, in the example shown, consists of four components EKOMP1 to EKOMP4. This is made clear with respect to the module width=1.63 determined by the counter 1. The measured module widths M' are recorded in units of the base running length B1' on the abscissa of the membership function E of FIG. 2 and the values of the components EKOMP1 to EKOMP4 of the membership function are recorded on the ordinate.

Figure 2:
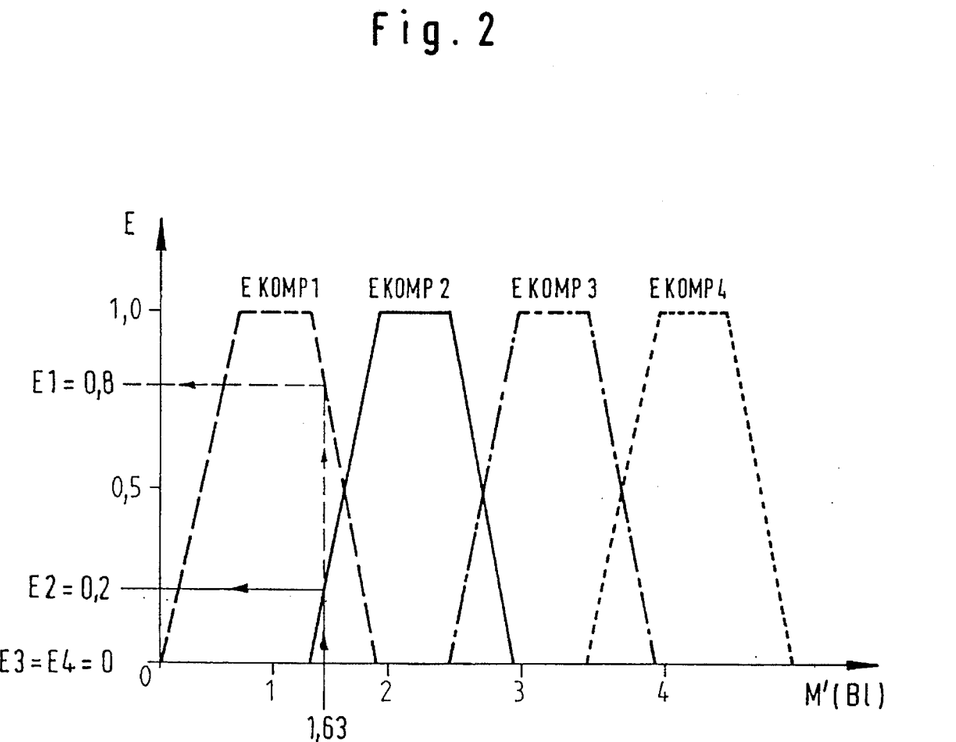
FIG. 2 is a graphic resprespentation of a first membership-function E, when the measured module width M' is recorded in units of the base running length on the abscissa and the fractions of membership E1 to E4 of the measured module width M to the integral module width values 1, 2, 3, 4 is recorded on the ordinate.

In FIG. 2 only one component is recorded for each module width occurring in the code; it is however also possible to use an membership function with further additional components. In particular it is advantageous, in order to obtain a better correction, to respectively add the further component to the membership function E closely above the largest and closely beneath the smallest module width. While it is advantageous for the illustrated components if they have a symmetrical form with respect to the module width arising in the code, it can be advantageous with the additional components to select a non-symmetrical shape. The shape of the components is not restricted to the illustrated curve shape and other curve shapes are conceivable.

Thus, a triangular shape can for example be selected whereby a maximum only occurs at a single position, with the maximum advantageously lying at a module width arising in the code. Another advantageous curve shape is a curve which has a shape of the form sin(x)/x within an interval around the module width but any of the desired curve shapes or combinations of curve shapes are conceivable.

If one goes vertically upward on the abscissa of the diagram of FIG. 2 at the module width M'=1.63 of the module 16 then one finds the fraction of the membership to the multiple of the base running length on the ordinate. With respect to the integral module width 1 one thus obtains a fraction of the membership of 0.25 and with respect to twice the base running length, the membership fraction of 0.8. The fraction of the membership to three times and four times the base running length is in each case the same as zero.

The membership function E is implemented in accordance with FIG. 5 in four look-up stages LUTE1 to LUTE4 in order to determine the correction values E1, E2, E3 and E4 respectively, i.e. the trapezoidal components EKOMP1, EKOMP2, EKOMP3, EKOMP4 of the membership function E is stored in accordance with FIG. 2 in LUTE1 to LUTE4.

The result E1 to E4 is determined by the stages LUTE1, LUTE2, LUTE3 and LUTE4. The output signals of the four stages are reproduced beneath the first module 16 of the diagram in FIG. 1E as E1=0.25, E2=0.8, E3=0 and E4=0 for the measurement result on the scanning of the module 16. These output signals correspond to the four values E1 to E4 which the four components EKOMP1 to EKOMP4 of the membership function E adopt at the position of the measured module width M'=1.63.

Figure 1E:
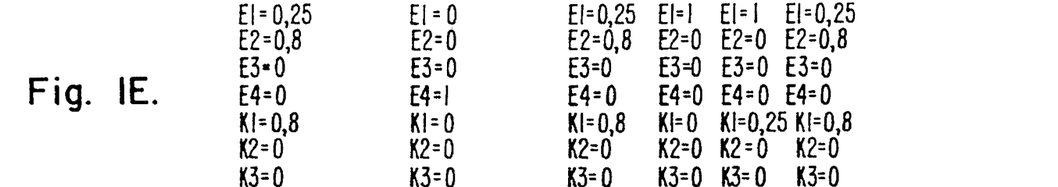

In corresponding manner the look-up tables LUTE1 to LUTE4 establish in laters steps, in which the correction stage 31 is acted on by the two module selection stage 30, the membership fractions for the measurement result at the other modules 17, 18, 19, 20 and 21. The result of these evaluations by LUTE1 to LUTE4 is respectively set forth beneath the relevant modules 17, 18, 19, 20 and 21 in FIG. 1. From FIG. 1 it is evident that the values E1 to E4 for the modules 16, 18 and 21 having the same measured module width are identical as is also to be expected with a unique or non-ambiguous function.

In order to take account of not only the membership fractions of the individually measured module widths but also of the optical distortion of a module b by the preceding module a, and thus to take account of the ratio of the width of sequential modules, a correction function K is also implemented in the correction stage 31 of FIG. 3 and indeed again by means of look-up stages LUTK1 to LUTK3. The correction function K is likewise a membership function but has however only three components in the example. These three components KKOMP1, KKOMP2, KKOMP3 of the second membership function K are reproduced in FIG. 3. The measured module widths M' are again reproduced on the abscissa in units of the base running length B1. The three components KKOMP1 to KKOMP3 of the membership function K are recorded on the ordinate.

Figure 3:
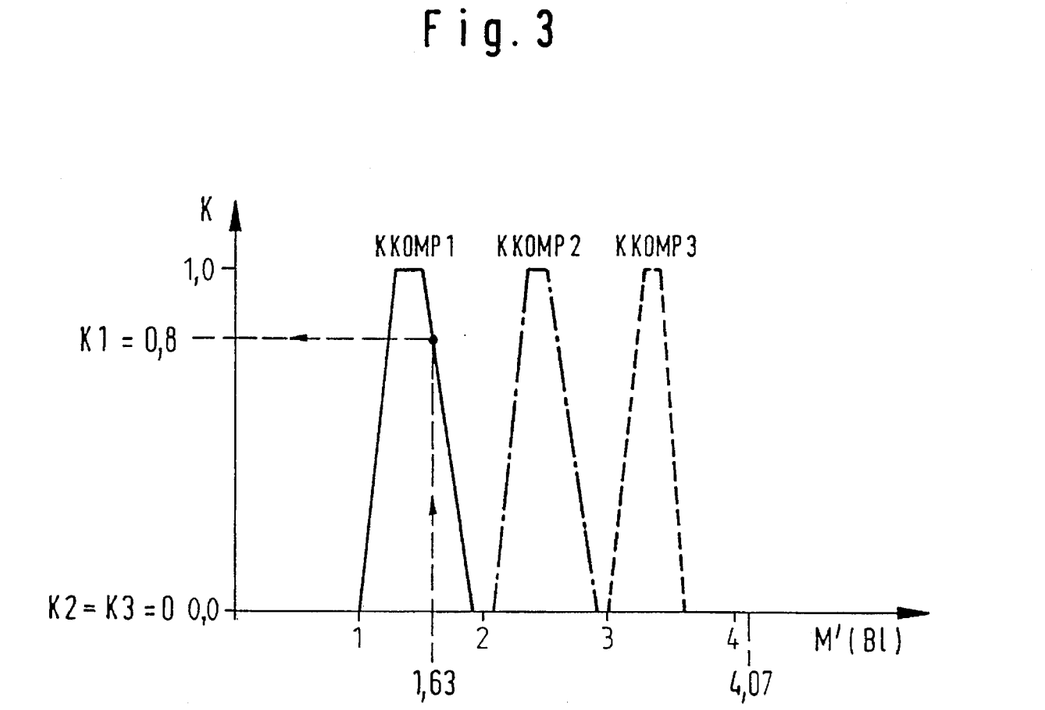
FIG. 3 is a graphic representation of a second membershipfunction K in which the measured module width M recorded on the abscissa in units of the base running length and the correction values K1 to K3 of the measured module width M between the integral module width values are recorded on the ordinate.

In the embodiment of FIG. 3 the correction value for all components of the correction function K is identical to zero for module widths M' which are smaller than one base running length. Between the running lengths 1 and 2, 2 and 3 and also 3 and 4 the components KKOMP1, KKOMP2, KKOMP3 of the second membership function K each exhibit a trapezoidal shape.

As in the case of the membership function E the possible shape of the second membership function, i.e. the correction function K is not restricted to the illustrated shape and the number of the components is also not restricted to the illustrated number. On the contrary it is possible to obtain a more precise correction with the method through the addition of further components KKOMP, with it also being for example possible to use a separate component for each pair of module widths possible in the code.

For the module 16 the scanning device has determined a width of 1.63 which results in accordance with the diagram of FIG. 3 in the correction value K1 of 0.8. The remaining two correction values K2 and K3 are equal to zero, as one can see from the statement beneath the module 16 in FIG. 1E.

For the module 17 with the measured module width M'=4.07 all three correction values K1=K2=K3=0 in accordance with FIG. 3, as is shown in FIG. 1E beneath the module 17.

The respectively determined K values K1 to K3 are likewise numerically reproduced in FIG. 1E for the further measured module widths of the modules 18, 19, 20 and 21.

In accordance with FIG. 5 the membership fractions E1 to E4 determined from the stages LUTE1 to LUTE4 and LUTK1 to LUTK3 for all the measured module widths M' and the correction values K1, K2 and K3 derived for all the measured modules with the exception of the first, are so linked in an algebraic combinatorial circuit 32 that a module width value Mk corrected towards the actual value respectively appears at the output 39 for each module 16, 17, 18, 19, 20 and 21. The algebraic combinatorial circuit 32 is part of the correction stage 31 and includes combining stages 35 and 36, an evaluation stage 37 and also an output 39.

A meaningful linking in which the measured width of a module b is corrected in accordance with the measured width of a preceding module a can be effected in detail with the scanning arrangement of FIG. 5 as follows:

The two module selection stage 30 supplies the correction stage 31 with a pair of sequentially measured module width values a and b. In the correction stage the values E1a to E4a, E1b to E4b and K1b to K3b are first determined in the stages LUTE1 to LUTE4 and LUTK1 to LUTK3. These values are deposited in the memories 33 and 34, of which the first memory 33 stores the fractions of the membership E1a to E4a of the first processed module width a (transmitted by the stages LUTE1 to LUTE4) and the second memory 34 temporarily stores the fractions E1b to E4b transmitted by the stages LUTE1 to LUTE4 and the correction values K1b to K3b of the second processed module width b.

In a first combinatorial stage 35 the membership fractions E1a to E4a of the first module width M'=LL1 from the memory 33 are linked by way of multiplication with the correction factors K1b to K3b of the second module width b from the memory 34 to give a result Z which consists of eight individual values. A further possibility for the computation of these eight parameters Z is set forth explicitly further below.

The signal Z transmitted from the multiplicatory combining stage 35 is linked in a second combining stage 36 with the membership fractions E1b, E2b, E3b, E4b of the second measured module width b which was stored in the memory 34. A preferred linking is set forth explicitly further below. In this linking four evaluation parameters A1b, A2b, A3b and A4b are derived in the combining stage 36 in accordance with the Z values which are influenced by the three correction factors K1b, K2b and K3b.

The four evaluation parameters A1b to A4b from the combining stage 36 are passed to the evaluation stage 37. Here the new corrected module width MK of the module b is determined from the four evaluation parameters A1b to A4b. The four evaluation parameters A1b to A4b represent, in analogy to E1b to E4b, the membership fraction to the corrected module width b. Thus, while the membership fractions to the given module widths were determined in the stages LUTE1 to LUTE4 and LUTK1 to LUTK3 the inverse step takes place in the evaluation stage 37; here several membership fractions, namely the evaluation parameters A1b to A4b are associated with an individual value; accordingly a reverse function to a membership function is implemented in the evaluation stage 37.

Figure 4:
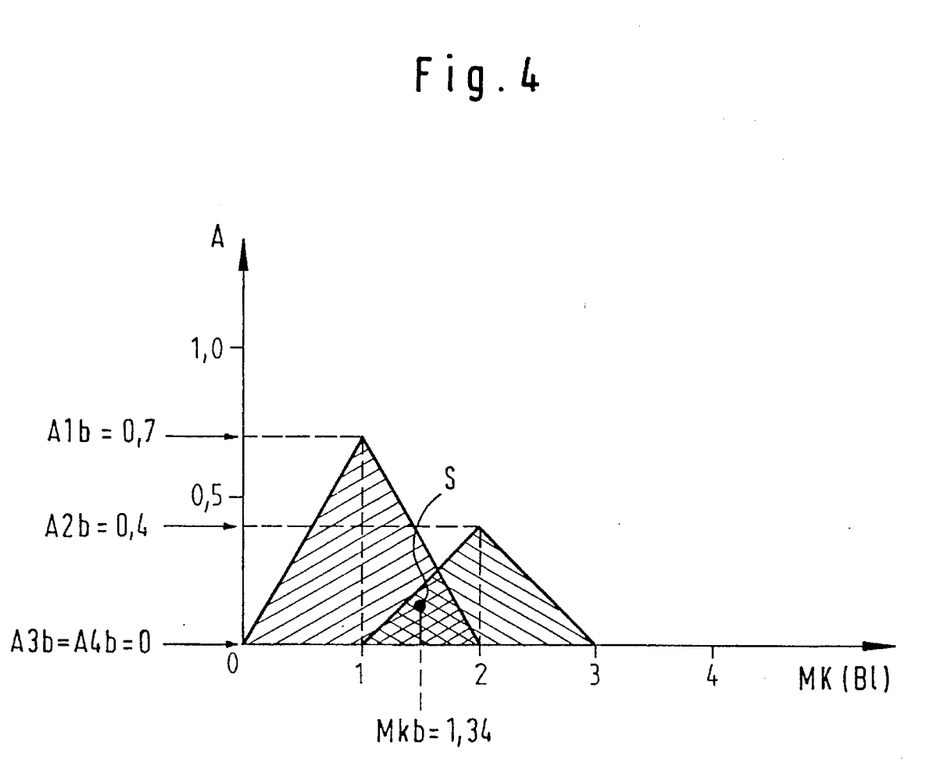
FIG. 4 is a graphic representation of an evaluation function, with the corrected module width Mk being recorded in units of the base running length on the abscissa and with the membership fractions A1 to A4 obtained by algebraic combination (of which only A1 and A2 are different from zero) of a module width M to the integral module width values 1, 2 being recorded on the ordinate, with equilateral triangles to the neighbouring integral module widths 0, 2; 1, 3 being set out beneath the membership values A1 to A4.

A possible evaluation function which can be algebraically implemented in the evaluation stage 37 is illustrated geometrically in FIG. 4.

FIG. 4 shows how a single corrected module width value Mk can be computed from the four evaluation parameters A1b to A4b.

An equilateral triangle is associated with each membership fraction A1b to A4b to a multiple of the base running length to be considered, here from one times to four times base running length. The center point of this triangle lies above the considered multiple value, the level corresponds to the value of the membership fraction and the width is given by the spacing of the considered multiple to the next multiple. The center of gravity of the area from all the triangular surfaces that are obtained lies above the result that is sought. In the example in FIG. 4 A1b=0.7; A2b=0.4; A3b=A4b=0. The membership values A1b and A2b of 0.7 and 0.4 are associated with the integral module width values 1 and 2 respectively and equilateral triangles of a height 0.7 and 0.4 to the neighbouring integral module width values are superimposed on the relevant diagram points. The common center of gravity S of the area of these triangles lies above the value of the corrected module width b of 1.34 on the abscissa. The algebraic implementation of this geometrical illustration is explicitly set forth further below.

In this process the evaluation function is again not restricted in the form and the number of components to the illustrated embodiment, in the same way as the functions E and K, and a larger set of membership fractions A can in particular result from the addition of additional components to the functions E and K.

The result of the evaluation stage 37, i.e. the corrected module width is present at the output 39. It is followed by a further evaluation stage 40 in which the corrected module width can be again combined groupwise in order to determine the mark 25 of the code 11 which is to be recognised. This can take place in such a way that the corrected module group is evaluated in accordance with the method described above, i.e. in accordance with the threshold value process; it is however also possible to pass the already corrected module width values to a correction stage such as a correction stage 31 a further time via a memory such as the memory 29 and a two module selection stage such as two module selection stage 30, in order to obtain a further correction passage and so to effect an iterative correction. It is thus possible to again pass the corrected module width values to combinatorial circuits which is similarly built up to the combinatorial circuit 32 in which however different functions can be implemented.

A specific computing example for the evaluation of the measurement at the mark 25 in accordance with FIG. 1C in the algebraic combinatorial circuit 32 of FIG. 5 while taking account of the functions of FIGS. 2, 3 and 4 and the module widths M'=LL1, LL2, LL3, LL4 and LL6 as deduced from FIGS. 1A through 1E is set forth in the following:

In this example $LL_{alt}$ signify the measured width of the module in front of the module 16 which is not shown in FIG. 1 of which only a part is to be recognised and which is designated with 23 (further above it was assumed that "23" was a white surface provided before the start of the code 11; in the present case it is assumed, in contrast thereto, that "23" is the last module of a preceding mark). LL1, LL2, LL3, LL4, LL5 and LL6 are the measured widths M' of the modules 16, 17, 18, 19, 20, 21. As set forth in FIG. 1 for the modules 16, 17, 18, 19, 20, 21 the module width measurement result in already normed form as deposited in the memory 29 is as follows:

| previous module | $LL_{alt}$ = 1.02 |
|---|---|
| module 16 | LL1 = 1.63 |
| module 17 | LL2 = 4.07 |
| module 18 | LL3 = 1.63 |
| module 19 | LL4 = 0.95 |
| module 20 | LL5 = 1.09 |
| module 21 | LL6 = 1.63 |

It will now be shown with reference to an example how the measured module width values can be corrected.

EXAMPLE 1

Here a correction of the measured module width 16, LL1 takes place by taking into account the distortion which was produced by the preceding module width $LL_{alt}$. In FIG. 5 one has to imagine a being replaced by $LL_{alt}$ and b being replaced by LL1.

In LUTE1 to LUTE4 the set of parameters E1a to E1b, i.e. $\{E(LL_{alt})\}$, is looked up and is then stored as follows as a set of parameters $\{E(LL_{alt})\}$ in the memory 33:

$$E1a = E1(LL_{alt}) = 1.0$$

$$E2a = E2(LL_{alt}) = 0$$

$$E3a = E3(LL_{alt}) = 0$$

$$E4a = E4(LL_{alt}) = 0$$

In the memory 34 the analog parameter sets E1b to E4b and also K1b to K3b, i.e. $\{E(LL1)\}$ and $\{K(LL1)\}$ respectively are stored:

| E1b = E1(LL1) = 0.3 | K1b = K1(LL1) = 0.9 |
|---|---|
| E2b = E2(LL1) = 0.67 | K2b = K2(LL1) = 0 |
| E3B = E3(LL1) = 0 | K3b = K3(LL1) = 0 |
| E4b = E4(LL1) = 0 | |

In the combining stage 35 the parameter sets $\{E(LL_{alt})\}$ and $\{K(LL1)\}$ are combined. Result of this combination is a set of parameters Z which serves in the linking circuit 36 for the computation of the four evaluation parameters A1B to A4b. As shown further below two Z parameters are required for the computation of each evaluation parameter. With four evaluation parameters A1b to A4b eight Z parameters are thus necessary. These eight parameters can be termed $Z1_1$, $Z1_2$, $Z2_1$, $Z2_2$, $Z3_1$, $Z3_2$, $Z4_1$, $Z4_2$. They are computed in that an intermediate step is first executed:

| general | specific example |
|---|---|
| $E1(LL_{alt})*K1(LL1) = Z2_1$ | $1.0*0.9 = 0.9$ |
| $E1(LL_{alt})*K2(LL1) = Z3_{11}$ | $1.0*0.0 = 0$ |
| $E2(LL_{alt})*K2(LL1) = Z3_{12}$ | $0.0*0.0 = 0$ |
| $E1(LL_{alt})*K3(LL1) = Z4_{11}$ | $1.0*0.0 = 0$ |
| $E2(LL_{alt})*K3(LL1) = Z4_{12}$ | $0.0*0.0 = 0$ |
| $E3(LL_{alt})*K3(LL1) = Z4_{13}$ | $0.0*0.0 = 0$ |
| $E4(LL_{alt})*K1(LL1) = Z1_{21}$ | $0.0*0.0 = 0$ |
| $E3(LL_{alt})*K1(LL1) = Z1_{22}$ | $0.0*0.9 = 0$ |
| $E2(LL_{alt})*K1(LL1) = Z1_{23}$ | $0.0*0.9 = 0$ |
| $E4(LL_{alt})*K2(LL1) = Z2_{21}$ | $0.0*0.0 = 0$ |
| $E3(LL_{alt})*K2(LL1) = Z2_{11}$ | $0.0*0.0 = 0$ |
| $E4(LL_{alt})*K3(LL1) = Z3_2$ | $0.0*0.0 = 0$ |

The desired eight Z parameters result from these intermediate values as follows:

| | |
|---|---|
| $Z1_1 = 0$ | $Z1_1 = 0$ |
| $Z2_1$ = as defined above | $Z2_1 = 0$ |
| $Z3_1$ = maximum ($Z3_{11}$, $Z3_{12}$) | $Z3_1 = 0$ |
| $Z4_1$ = maximum ($Z4_{11}$, $Z4_{12}$, $Z4_{13}$) | $Z4_1 = 0$ |
| and | |
| $Z1_2$ = maximum ($Z1_{21}$, $Z1_{22}$, $Z1_{23}$) | $Z1_2 = 0$ |
| $Z2_2$ = maximum ($Z2_{21}$, $Z2_{22}$) | $Z2_2 = 0$ |
| $Z3_2$ = as defined above | $Z3_2 = 0$ |
| $Z4_2 = 0$ | $Z4_2 = 0$ |

In the combinatorial circuit 36 the intermediate parameters which contain the correction information are now computed with the input parameters of the measured module widths which are to be corrected in order to obtain four evaluation parameters A1b to A4b for the determination of the corrected module width of the module b:

| general | Example |
|---|---|
| A1b = ($Z1_1$ + $Z1_2$ + E1(LL1))/3 | A1b = 0.1 |
| A2b = ($Z1_1$ + $Z2_2$ + E2(LL1))/3 | A2b = 0.53 |
| A3b = ($Z3_1$ + $Z3_2$ + E3(LL1))/3 | A3b = 0 |
| A4b = ($Z4_1$ + $Z4_2$ + E4(LL1))/3 | A4b = 0 |

The corrected running length Mk of the module 16 is now derived in accordance with FIG. 4 in the stage 37 from the so computed four starting parameters A1b to A4b, with the following evaluation formula being used as the algebraic realisation of the geometrical illustration given in FIG. 4:

$$Mk = (A1b*1 + A2b*2 + A3b*3 + A4b*4)/(A1 + A2 + A3 + A4)$$

In numbers there results for the example:

$$MK = (0.1*1 + 0.523*2 + 0*3 + 0*4)/(0.1 + 0,523 + 0 + 0) = 1.839.$$

Thus the value of the module 16 has been corrected from the measured value 1.632 to the corrected value 1.839.

EXAMPLE 2

Here the sequentially measured module widths of the modules 16, 17 are evaluated in an analogy to example 1. The values LL1 and LL2 are the measured module widths a and b evident from FIGS. 1 and 5.

In the memory 33 the membership fractions E1a to E4a are stored as a set of parameters $\{E(LL1)\}$:

$$E1(LL1) = 0.3$$

$$E2(LL1) = 0.67$$

$$E3(LL1) = 0$$

$E4(LL1)=0$

In the memory the membership fraction elements E1b to E4b are stored in analogous manner as the set of parameters {E(LL2)} and the correction values K1b to K3b are stored as the set of parameters {K(LL2)}:

| | |
|---|---|
| E1(LL2) = 0 | K1(LL2) = 0 |
| E2(LL2) = 0 | K2(LL2) = 0 |
| E3(LL2) = 0 | K3(LL2) = 0 |
| E4(LL2) = 1.0 | |

Since the correction values K1b, K2b and K3b are all zero the value of all eight intermediate parameters Z is likewise zero independently of {E(LL1)}. Thus the evaluation parameter set {A}, i.e. the values A1b to A4b correspond to the membership fraction part set {E(LL2)}, i.e. E1b to E4b. This must also be the case as the measured module width LL2 with a value of 4.07 is not distorted. The corrected module width is thus likewise computed in accordance with the above evaluation formula as:

$MK(LL2)=4.07$

EXAMPLE 3

Here the measured module widths of the moduls 17, 18 are now evaluated. For this purpose one has to imagine a in FIG. 5 being replaced by LL2 and b being replaced by LL3. In the memory 33 the values E1a to E4a are stored as the parameter set {E(LL2)}:

$E1(LL2)=0$ $E2(LL2)=0$ $E3(LL2)=0$ $E4(LL2)=1.0$

In the memory 34 the membership fractions E1b to E4b are stored as a set of parameters {E(LL3)} and the correction values K1b to K3b as a set of parameters {K(LL3)}:

| | |
|---|---|
| E1(LL3) = 0.3 | K1(LL3) = 0.9 |
| E2(LL3) = 0.67 | K2(LL3) = 0 |
| E3(LL3) = 0 | K3(LL3) = 0 |
| E4(LL3) = 0 | |

The insertion of these values into the formulae set forth under the example 1 results in a corrected module width of $Mk(LL3)=1.358$.

Attention should be paid here to the fact that the measured module width value for the moduls 16 and 18 of 1.63 is identical for both modules. The width of the respectively preceding modules is however different; the module preceding the module 16 which is not fully shown in FIGS. 1A through 1E has a width of 1.02 and is thus narrower than the module 16. The module 17 preceding the module 18 has a width of 4.07 and is thus broader than module 18. These differences of the preceding modules lead, despite the same measured module widths for the modules 16 and 18 to different values of the corrected module widths, namely to values of 1.84 and 1.36 respectively. Thus the optical distortion of the modules by the preceding module is corrected.

The above named examples reproduce only one of many conceivable cases. The example of the mark 25 of FIGS. 1A through 1E contains however three typical cases such as repeatedly arise, namely that a small module width distorts a large module width (example 1), a large modle width distorts a small module width (example 3) and that no distortion arises (example 2). The computing steps for the other module width pairs are analogous. With the above quoted minimal configuration all other normal running length relationships can actually be detected.

I claim:

1. A method for identifying a code comprising a base running length and a plurality of marks with sequential light and dark fields which form modules, each module having a module width upwardly restricted by an integral multiple number of base running lengths, each mark having a predetermined number of sequential modules and base running lengths, the method comprising:

guiding a light bead with a light transmitter of an optical scanning device in sequence over the modules of the plurality of marks, the light bead having an extent less than 1.5 times greater than the base running length of the code;

receiving scattered light from the code with a light receiver;

generating electrical signals corresponding to the scattered light;

differentiating and rectifying the electrical signals to generate a sequence of individual pulses of differing widths, each pulse being associated with a boundary between adjacent modules in the mark, wherein the time at which the pulses reach a predetermined level defines measured boundaries of the modules to form measured module widths;

combining the boundaries into groups corresponding to each mark;

normalizing each group with respect to a temporal length and a time spacing of adjacent boundaries to determine actual module widths in units of the base running length of the code;

computing a combination module width based on the measured module width of two sequential modules;

determining an appropriate correction value for said two sequential modules from a quantity of predetermined correction values, the predetermined correction values being based on reference module widths for a plurality of combinations of sequential modules for dioptic scanning devices; and correcting the combination module width of the two sequential modules based on the appropriate correction value.

2. The method of claim 1 wherein the extent of the light bead is smaller than the base running length of the code.

3. The method of claim 1 wherein the light bead is periodically scanned over the modules.

4. The method of claim 1 wherein the predetermined levels of the pulses is determined by an average height of a plurality of reference pulses.

5. The method of claim 1 further comprising the steps of repeatedly scanning the code with the light beads and averaging values received during the repeated scanning steps.

6. The method of claim 1 further comprising iteratively correcting the combination measured widths.

7. The method of claim 1 further comprising measuring known marks and determining the predetermined correction values.

8. The method of claim 1 further comprising subdividing the measured module widths into fractions of the base running length of the code.

9. The method of claim 1 further comprising empirically forming a first membership function for obtaining the correction values, the first membership function designating, for each measured module width, fractions of the first membership function to predetermined module widths based on integral multiples of the base running length, a maximum integral multiple being equal to a longest module encountered in the code.

10. The method of claim 9 further comprising empirically forming a second membership function which determines correction values based on a deviation of the measured module from the next closest integral module width.

11. The method of claim 10 the correction values are proportional to the deviation of the measured module width from the next closest module width, the correction values including a constant maximum region in an area of maximum deviation.

12. The method of claim 11 wherein only the fractions of the first membership function are formed from the measured module widths of a first module of the code.

13. The method of claim 12 wherein both the fractions of the first membership function and the correction values from the second membership function are formed from the measured module widths of a second module of the code.

14. The method of claim 13 the fractions of the first membership function and the correction values from the second membership function from the second module of the code are linked with the fractions of the first membership function from the first module of the code to thereby form corrected module widths which lie closer to the actual module widths than the measured module widths.

15. The method of claim 9 wherein the first membership function comprises components that lie outside of a respective interval of finite length corresponding to the associated integral multiple of the base running length, the finite length being less than or equal to twice the base running length of the code, the portion of the first membership function increasing with the respective interval of finite length to a maximum value and subsequently decreasing to an end of the respective interval.

16. The method of claim 15 wherein the maximum value occurs at an integral multiple of the base running length of the code.

17. The method of claim 15 wherein at least one of the components of the first membership function reaches the maximum value at a single discrete multiple of the base running length of the code.

18. The method of claim 15 wherein at least one of the components of the first membership function reaches the maximum value over a region of the base running length of finite width.

19. The method of claim 15 wherein the first membership function comprises at least one of the components for module in the code.

20. The method of claim 15 wherein the first membership function comprises one of the first components for each measured module width in the code, the first membership function further comprising additional components with maxima above and below the largest and smallest module widths, respectively, wherein the maxima corresponding to the component below the smallest module width is greater than half of the smallest module width and wherein the maxima corresponding to the component above the largest module width is less than the largest arising module width plus an integral multiple of the base running length.

21. The method of claim 15 wherein each component of the first membership function which has a maximum at a module width arising in the code has a symmetrical shape within a finite interval of the base running length.

22. The method of claim 15 wherein each component of the first membership function which does not have a maximum at a module width arising in the code has an asymmetrical shape.

23. The method of claim 15 wherein at least one of the components of the first membership function has a linear gradient from a beginning of an interval to the maximum value and from the maximum value to an end of the interval.

24. The method of claim 15 wherein the components of the first membership function has the formula:

$$EKOMP(X)=A+B*[SIN(X)/X]$$

with A being a constant substantially close to 0.0, B being a constant substantially close to 1 and X being equal to C* (the module width).

25. The method of claim 15 wherein the first membership function equals zero outside of the interval of finite length of leas than or equal to twice the base running length which lies near the considered multiple of the base running lengths.

26. The method of claim 10 wherein the second membership function comprises components within respective intervals of the integral multiples of the base running lengths, said components of the second membership function increasing to a maximum value and then decrease from the maximum value, said components having small values outside of the respective intervals of the integral multiples of the base running lengths.

27. The method of claim 26 wherein the second membership function equals zero between the base running length and zero.

28. The method of claim 26 wherein the components of the second membership function equal zero outside of the intervals of the integral multiples of the base running lengths.

29. The method of claim 26 wherein the components of the second membership function begin to increase at the integral multiples of the base running length and commence decreasing before the next integral multiple.

30. The method of claim 26 wherein the components of the second membership function have a linear gradient from a beginning of an interval to the maximum value and from the maximum value to an end of the interval.

31. The method of claim 9 further comprising:
linking the correction values for each combination module width with the fractions of the combination module width of the preceding module to form a first linked value;
linking the linked value with the respective combination module width to form a second linked value; and
averaging the second linked value with an evaluation function to generate an averaged value that lies closer to the actual module width than the measured module width.

32. The method of claim 31 wherein the evaluation function comprises functions which extend symmetrically around each integral multiple of the base running length, the functions having maximum values equal to the first linked value.

33. An optical scanning apparatus for identifying a code comprising a base running length and a plurality of marks with sequential light and dark fields which form modules, each module having a module width upwardly restricted by an integral multiple number of base running lengths, each mark having a predetermined number of sequential modules and base running lengths, the apparatus comprising:

an optical scanning device having a light transmitter for guiding a light bead in sequence over the modules of the plurality of marks;

a light receiver for receiving scattered light from the code;

means, operably coupled to the light receiver, for generating electric signals corresponding to the scattered light;

a differentiating stage, operably coupled to the generating means, for differentiating and rectifying the scattered light;

a clock generator for generating a sequence of individual pulses of differing widths, each pulse being associated with a boundary between adjacent modules in the mark, wherein the time at which the pulses reach a predetermined level defines measured boundaries of the modules to form measured module widths;

a memory storage, the clock generator storing the pulses in the memory storage;

a two module selection stage for detecting a combination module width based on the measured module width of two sequential modules; and a correction stage for receiving the combination module width and for determining a correction value for said two sequential modules from a quantity of predetermined correction values, the predetermined correction values being based on reference module widths for a plurality of combinations of sequential modules for dioptic scanning devices, the correction stage correcting the combination module width of the two sequential modules based on the appropriate correction value.

34. The apparatus of claim 33 wherein the extent of the light bead is smaller than the base running length of the code.

35. The apparatus of claim 33 wherein the optical scanning device periodically scans the light beads over the modules.

36. The apparatus of claim 33 wherein the correction stage comprises a look-up stage for storing a first membership function having components associated with an integral multiple of the base running length of the code, the first membership function designating, for each measured module width, fractions of the first membership function to predetermined module widths based on integral multiples of the base running length.

37. The apparatus of claim 36 wherein the correction stage further comprises a second look-up stage for storing a second membership function which determines correction values based on a deviation of the measured module from the next closest integral module width.

38. The apparatus of claim 37 further comprising a algebraic linking circuit for receiving outputs of the first and second look-up stages.

39. The apparatus of claim 38 wherein the algebraic linking circuit comprises:

first and second memories connected in parallel for temporarily storing the fractions of the first membership function determined in the first and second look-up stages for a first measured module width, the first and second memories storing the fractions of the first membership function and the correction values for a second measured module width;

a combining stage coupled to the first and second memories for linking the fractions of the first measured module width with the correction values of the second measured module width to form a first linked output;

a second combining stage coupled to the first combining stage and the second memory for linking the first linked output with the fractions of the second measured module width to form a second linked output; and an evaluation stage for averaging the second linked output with an evaluation function to generate a corrected module width closer to the actual module width that the measured module width.

40. The apparatus of claim 39 wherein the evaluation function is generated from functions that extend symmetrically about each integral multiple of the base running length.

41. The apparatus of claim 40 further comprising a threshold member coupled between the differentiating stage and the clock generator for transmitting a resetting signal and a trigger signal to the clock generator at a time when the amplitude of the pulses do not equal a predetermined amplitude.

* * * * *